US010685482B2

(12) United States Patent
Medwedeff et al.

(10) Patent No.: US 10,685,482 B2
(45) Date of Patent: Jun. 16, 2020

(54) SYSTEM AND METHOD FOR 3D RESTORATION OF COMPLEX SUBSURFACE MODELS

(71) Applicant: CHEVRON U.S.A. INC., San Ramon, CA (US)

(72) Inventors: Donald A. Medwedeff, Houston, TX (US); Stan Nicolas Patrice Jayr, Houston, TX (US); Peter J. Lovely, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 510 days.

(21) Appl. No.: 15/592,443

(22) Filed: May 11, 2017

(65) Prior Publication Data
US 2017/0330373 A1 Nov. 16, 2017

Related U.S. Application Data

(60) Provisional application No. 62/336,109, filed on May 13, 2016.

(51) Int. Cl.
*G06T 17/05* (2011.01)
*G01V 99/00* (2009.01)
*G06T 19/20* (2011.01)

(52) U.S. Cl.
CPC ............ *G06T 17/05* (2013.01); *G01V 99/005* (2013.01); *G06T 19/20* (2013.01); *G06T 2219/2016* (2013.01)

(58) Field of Classification Search
CPC ........ G06T 17/05; G06T 19/20; G01V 99/005
USPC .......................................................... 703/1
See application file for complete search history.

(56) References Cited

U.S. PATENT DOCUMENTS

| 7,079,953 | B2 * | 7/2006 | Thorne | G01V 1/30 702/16 |
| 7,369,980 | B2 * | 5/2008 | Deffenbaugh | G01V 1/301 703/10 |
| 7,480,205 | B2 * | 1/2009 | Wei | G01V 1/282 367/37 |

(Continued)

OTHER PUBLICATIONS

Hebel et al. ("Three-dimensional imaging of subsurface structural patterns using quantitative large-scale multi configuration electromagnetic induction data", AGU Publications, 2014, pp. 2732-2748) (Year: 2014).*

(Continued)

*Primary Examiner* — Iftekhar A Khan
(74) *Attorney, Agent, or Firm* — Marie L. Clapp (57) ABSTRACT

A geometric method is described for 3D structural restoration of a subsurface model including receiving data representative of a subsurface volume of interest including one or more chronohorizons and the geometry and topology of any faults of relevance; developing a fault framework model of the subsurface volume of interest; selecting a horizon, the deposition of which represents the geologic time to which the structural model should be restored; developing coordinate transformation constrained by a single datum horizon and, optionally, additional geologic constraints; applying the 3D transformation to all geologic features below and, optionally, above the datum surface; and scaling the vertical coordinates to accurately relate vertical and horizontal dimensions. The method may be executed by a computer system.

14 Claims, 7 Drawing Sheets

(56) References Cited

U.S. PATENT DOCUMENTS

| | | | | |
|---|---|---|---|---|
| 7,523,024 | B2* | 4/2009 | Endres | G01V 11/00 |
| | | | | 703/6 |
| 8,274,859 | B2* | 9/2012 | Maucec | G01V 99/00 |
| | | | | 367/43 |
| 8,600,708 | B1* | 12/2013 | Mallet | G06T 17/20 |
| | | | | 703/2 |
| 8,743,115 | B1* | 6/2014 | Mallet | G01V 1/302 |
| | | | | 345/424 |
| 8,798,974 | B1* | 8/2014 | Nunns | G01V 99/005 |
| | | | | 703/6 |
| 9,053,570 | B1* | 6/2015 | Mallet | G01R 31/50 |
| 9,229,138 | B2 | 1/2016 | Samson et al. | |
| 9,536,022 | B1* | 1/2017 | Tertois | G06F 30/23 |
| 9,600,608 | B2* | 3/2017 | Poudret | G01V 99/005 |
| 9,646,415 | B2* | 5/2017 | Hanson | G06K 9/0063 |
| 9,690,002 | B2* | 6/2017 | Mallet | G01V 1/282 |
| 9,759,826 | B2* | 9/2017 | Mallet | G01V 1/302 |
| 9,779,296 | B1* | 10/2017 | Ma | G06K 9/00463 |
| 10,310,137 | B1* | 6/2019 | Mallet | G01V 99/005 |
| 2002/0032550 | A1* | 3/2002 | Ward | G06F 30/13 |
| | | | | 703/2 |
| 2003/0216897 | A1* | 11/2003 | Endres | G01V 99/005 |
| | | | | 703/10 |
| 2004/0267454 | A1* | 12/2004 | Granjeon | G01V 99/005 |
| | | | | 702/2 |
| 2005/0216197 | A1* | 9/2005 | Zamora | G01V 1/34 |
| | | | | 702/6 |
| 2007/0024623 | A1* | 2/2007 | Dugge | G06T 17/05 |
| | | | | 345/441 |
| 2007/0040838 | A1* | 2/2007 | Jeffrey | G06T 3/40 |
| | | | | 345/501 |
| 2008/0021684 | A1* | 1/2008 | Dulac | G01V 11/00 |
| | | | | 703/9 |
| 2008/0243447 | A1* | 10/2008 | Roggero | G01V 1/30 |
| | | | | 703/1 |
| 2009/0135191 | A1* | 5/2009 | Azar | A61B 6/502 |
| | | | | 345/522 |
| 2009/0157322 | A1* | 6/2009 | Levin | G01V 1/34 |
| | | | | 702/16 |
| 2010/0175886 | A1* | 7/2010 | Bohacs | G06N 7/005 |
| | | | | 166/369 |
| 2011/0015910 | A1* | 1/2011 | Ran | G06T 17/20 |
| | | | | 703/2 |
| 2011/0115787 | A1* | 5/2011 | Kadlec | G01V 1/345 |
| | | | | 345/419 |
| 2011/0264430 | A1* | 10/2011 | Tapscott | G01V 99/00 |
| | | | | 703/10 |
| 2012/0029895 | A1* | 2/2012 | Xi | G01V 99/005 |
| | | | | 703/10 |
| 2012/0037379 | A1* | 2/2012 | Hilliard | G06T 17/20 |
| | | | | 166/369 |
| 2013/0124161 | A1* | 5/2013 | Poudret | G06F 30/20 |
| | | | | 703/2 |
| 2013/0204598 | A1* | 8/2013 | Mallet | G01V 1/325 |
| | | | | 703/6 |
| 2013/0216897 | A1 | 8/2013 | Kim et al. | |
| 2014/0136171 | A1* | 5/2014 | Sword, Jr. | G06F 30/20 |
| | | | | 703/10 |
| 2014/0278106 | A1* | 9/2014 | Mallet | G01V 99/005 |
| | | | | 702/2 |
| 2014/0278298 | A1* | 9/2014 | Maerten | G01V 99/005 |
| | | | | 703/2 |
| 2015/0120262 | A1* | 4/2015 | Dulac | G01V 1/325 |
| | | | | 703/6 |
| 2015/0294036 | A1* | 10/2015 | Bonner | G06F 17/10 |
| | | | | 703/1 |
| 2016/0370482 | A1* | 12/2016 | Mallet | G01V 1/282 |
| 2017/0184760 | A1* | 6/2017 | Li | G06F 30/20 |
| 2018/0067229 | A1* | 3/2018 | Li | G01V 1/282 |

OTHER PUBLICATIONS

Maerten et al. ("Dynel: New Tools for the Restoration of 2-D and 3-D Geological Structures",Stanford Rock Fracture Project vol. 13, 2002, pp. G-1-G-5) (Year: 2002).*

Ferrill et al. ("Extensional layer-parallel shear and normal faulting", Journal o/'Structural Geolr)g~, vol. 20, No. 4, pp. 355 to 362, 1998) (Year: 1998).*

Ferrill et al. ("Extensional layer-parallel shear and normal faulting", Journal o/'Structural Geology, vol. 20, No. 4, pp. 355 to 362, 1998) (Year: 1998).*

Griffiths et al. ("A new technique for 3-D flexural-slip restoration", Journal of structural Geology 24, pp. 773-782) (Year: 2002).*

Hebel et al. ("Three-dimensional imaging of subsurface structural patterns using quantative large-scale multiconfiguration electromagnetic induction data", water resource research, 2014, pp. 2732-2748) (Year: 2014).*

Maerten et al. ("Dynel: New Tools for the Restoration of 2-D and 3-D Geological Structures", Stanford Rock Fracture Project vol. 13, 2002, pp. 1-6) (Year: 2002).*

Bates and Jackson, 1980, Glossary of Geology, 2nd Edition, American Geological Institute, Falls Church, Virginia. pp. 111.

Boyer, S.E. and Elliott, D., 1982. Thrust systems. AAPG Bulletin, 66(9), pp. 1196-1230.

Clarke, S.M., Burley, S.D., Williams, G.D., Richards, A.J., Meredith, D.J. and Egan, S S 2006. Integrated four-dimensional modelling of sedimentary basin architecture and hydrocarbon migration. Geological Society, London, Special Publications, 253 (1), pp. 185-211.

Cornu, T. and F. Schneider. Institute Francais Du Petrole, 2003, Method for forming a 3D kinematic deformation model of a sedimentary basin. U.S. Pat. No. 6,597,995 B1.

Dahlstrom, C.D.A., 1969. Balanced cross sections. *Canadian Journal of Earth Sciences*, 6(4), pp. 743-757.

Durand-Riard, P., Caumon, G. and Muron, P., 2010. Balanced restoration of geological volsumes with relaxed meshing constraints. Computers & Geosciences, 36(4), pp. 441-452.

Endres, D.M. and Bouzas, H.R., Schlumberger Technology Corporation, 2009. Modeling geologic objects in faulted formations. U.S. Pat. No. 7,523,024 B2.

Geiser, J., P.A. Geiser, R. Kligfield, R. Ratliff, M. Rowan, 1988, New applications of computer-based section construction: strain analysis, local balancing, and subsurface fault prediction, The Mountain Geologist, 25 (1988), pp. 47-59.

Gratier, J.P. and Guillier, B., 1993. Compatibility constraints on folded and faulted strata and calculation of total displacement using computational restoration (UNFOLD program). Journal of structural geology, 15(3-5), pp. 391-402.

Guzofski, C.A., Mueller, J.P., Shaw, J.H., Muron, P., Medwedeff, D.A., Bilotti, F. and Rivero, C., 2009. Insights into the mechanisms of fault-related folding provided by volumetric structural restorations using spatially varying mechanical constraints. AAPG bulletin, 93(4), pp. 479-502.

Maerten, F., Schlumberger Technology Corporation, 2014. Meshless representation of a geologic environment. U.S. Appl. No. 14/197,661.

Mallet, J.L., 2002. Geomodeling. Oxford University Press, Section 8.5, pp. 405-414.

Mallet, J.L., 2002. Geomodeling. Oxford University Press, Section 8.6, pp. 418-441.

Mallet, J.L., 2014. Elements of mathematical sedimentary geology: The GeoChron model. EAGE., Chp 2.6, pp. 90-95.

Mallet, J.L., Paradigm Sciences Ltd., 2016. Systems and methods for building axes, co-axes and paleo-geographic coordinates related to a stratified geological volume. U.S. Pat. No. 9,229,130.

Medwedeff, Donald A., and John Suppe. "Multibend fault-bend folding." Journal of Structural Geology 19.3-4 (1997): 279-292.

Rainaud, J-F, Verney, P., Schneider, S. and Poudret, M., Full Scale Example of a Knowledge-based Mehtod for Building and Managing an Earth Model, in Perrin, M., and Rainaud, J-F., 2013. 3 Earth Models Used in Petroleum Industry: Current Practice and Future Challenges. Shared Earth Modeling: Knowledge Driven Solutions for Building and Managing Subsurface 3D Geological Models, p. 49.

(56) References Cited

OTHER PUBLICATIONS

Wei, K., Landmark Graphics Corporation, 2009. 3D fast fault restoration. U.S. Pat. No. 7,480,205.
PCT International Search Report and Written Opinion, International Application No. PCT/US2017/032119, dated Jun. 29, 2017, pp. 1-13.
Griffiths, et al., A new technique for 3-d Flexural-Slip Restoration, #40038, pp. 1-16, Apr. 2002, Denver, CO.
PCT International Preliminary Report on Patentability, dated Nov. 22, 2018, issued in International Application No. PCT/US2017/032119, filed on May 11, 2017, 9 pages.

* cited by examiner

SYSTEM AND METHOD FOR 3D RESTORATION OF COMPLEX SUBSURFACE MODELS

CROSS-REFERENCE TO RELATED APPLICATIONS

The present application claims the priority benefit of U.S. Provisional Application Ser. No. 62/336,109, filed on May 13, 2016, which is incorporated herein by reference in its entirety.

STATEMENT REGARDING FEDERALLY SPONSORED RESEARCH OR DEVELOPMENT

Not applicable.

TECHNICAL FIELD

The disclosed embodiments relate generally to techniques for mapping present-day geological structure back to historical geological structure, and specifically to techniques for 3D structural restoration of complex subsurface models.

BACKGROUND

Extending "Balanced Cross-Section" structural validation techniques to three dimensions has been an area of active research and development for two decades. Due to the inherent difficulty of the challenge, the resulting tools and methods have had limited practical application. We propose that the advent of so-called "Geological Knowledge-Oriented" earth models makes this traditionally difficult problem more practical.

Accurate depiction of subsurface structure is fundamental to petroleum exploration and development. Similarly, an accurate understanding of the kinematic development of structurers through geologic time is a key constraint to petroleum system and other modeling techniques based on application of physical principals. However, subsurface and deep-time analysis of geologic structures is highly underconstrained. Traditional "balanced sections" and restoration tools were developed to test the plausibility of interpretation based on fundamental concepts of mass-conservation (simplified to area or line-length conservation) and kinematic compliance (Dhalstrom, 1969, Boyer and Elliott, 1982, and Medwedeff and Suppe, 1997). Although natural variation in the mechanical properties of rocks is important, use of mechanical models in restoration is severely challenged by the inelastic, non-reversible, and non-linear rheology of rock strata.

Manual and computer-aided workflows for application of balancing concepts to cross section construction and analysis are widely applied in structural geologic analysis. These tools are effective in areas where the geologic deformation approximates plane-strain but are difficult to apply and much less predictive in areas with more general or more complex deformation.

Computer-aided approaches extending balancing constraints to mapped horizons and 3D have been under development for about twenty years (e.g. Geiser, et al., 1988, Durand-Riard, P., et al., 2010). Approaches that have been applied include:

vertical-shear flattening of fault blocks (Gratier and Guillier, 1993),
surface unfolding (Mallet, 2002; Chapter 8.5),
multiple-surface unfolding (Mallet, 2002; Chapter 8.6),
fault slip accommodated by vertical-shear (e.g. Clarke et al, 2006),
fault-parallel flow, and
mechanical (typically elastic) unfolding (e.g Guzofski et al., 2009 and U.S. Pat. No. 7,480,205 B2).

Although several commercial products have been or are being developed (Geosec-3D®; 3D Move®; KINE3D®, and Dynel3D®) none, in our view, have gained routine use for interpretation validation. Again, in our view, the reasons for this are a combination of (1) the limited flexibility to or (2) the great effort required to properly treat complex geometry and topology inherent in geologic structures for which the tools would be most useful. Mechanical solutions to restoration are additionally challenged by the need for specification of scale-appropriate, effective rheology parameters throughout the volume of interest. Such parameters are largely unconstrained.

There exists a need for improved restoration methods for complex subsurface models that will allow better seismic interpretation of potential hydrocarbon reservoirs.

SUMMARY

In accordance with some embodiments, a method of 3D structural restoration of a subsurface model including receiving data representative of a subsurface volume of interest including at least a complex model and a set of geologic horizons, developing a fault framework model of the subsurface volume of interest within a tetrahedral mesh, developing geologic-time and space parameterizations based on the geologic horizons and fault framework; and generating a 3D restored structural model of the subsurface from the complex model and the geologic-time and space parameterizations is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of geologic modeling. These embodiments are designed to be of particular use for geologic modeling of subsurface volumes in geologically complex areas.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Definitions

Chronohorizon—A stratigraphic surface or interface that is everywhere of the same age. (Bates and Jackson, 1980)

Paleo-geographic restoration coordinates—An alternate 2D system of coordinates representing the relative geographic location of a point in the volume of interest at the prior time represented by a restoration to a given datum horizon Paleo-geographic coordinates—An alternate system of coordinates representing the relative geographic location of a chronohorizon at its time of formation Paleo-vertical coordinate—The perpendicular distance to the datum surface in restored space. This term may be applied before or after vertical scaling Isovalue surface—The surface represented by a constant value of a scalar field in 3-dimensional space, in this case applied to the paleo-vertical coordinate Fault compliance—The continuity of paleo-geographic restoration coordinate values across faults in restored space Distortion—The relative displacement of particles in a body that excludes ridged body motions Geoscience data—Any surface or subsurface measurements, observations, and/or relationships that describe or constrain the geological state of the volume of interest The present invention includes embodiments of a method and system for 3D structural restoration of complex subsurface models. From our experience, a practical 3D restoration method has three or four fundamental requirements:

1. flexibility to accurately model complex geometry and topology inherent in geologic structures for which interpretation validation is most necessary,
2. facility to develop such complex models with a degree of effort proportionate to the value,
3. a resulting product that clearly and specifically indicates the degree of validity of the tested interpretation, and if required,
4. viability of the resulting restoration as input to subsequent modeling.

Meeting these four needs requires a high degree of software engineering and computational power that has been unavailable until recently.

In the past few years, commercial products have been developed implementing Geological Knowledge-Oriented model descriptions (Rainaud and Perrin, 2013; Mallet, 2014). One aspect of these models is the ability to globally specify stratigraphic correlation and relative paleo-geographic position within the volume of interest. Although these approaches are not 3D structural restorations (Mallet, 2014), we believe that these tools provide the ability for practitioners to develop quantitative and robust models for complex geologic structures and these models provide the foundation for practical 3D restoration workflows.

The technology described herein is an extension and adaptation for purposes of structural restoration of Geological Knowledge-Oriented modeling technology covered by U.S. Pat. No. 9,229,130 B1, "Systems and methods for building axes, co-axes and paleo-geographic coordinates related to a stratified geological volume." Similar adaptations could be made to other Geological Knowledge-Oriented modeling implementations, such as those based on meshless representations as described in U.S. Patent Application 2014/0278298.

Figure 1:
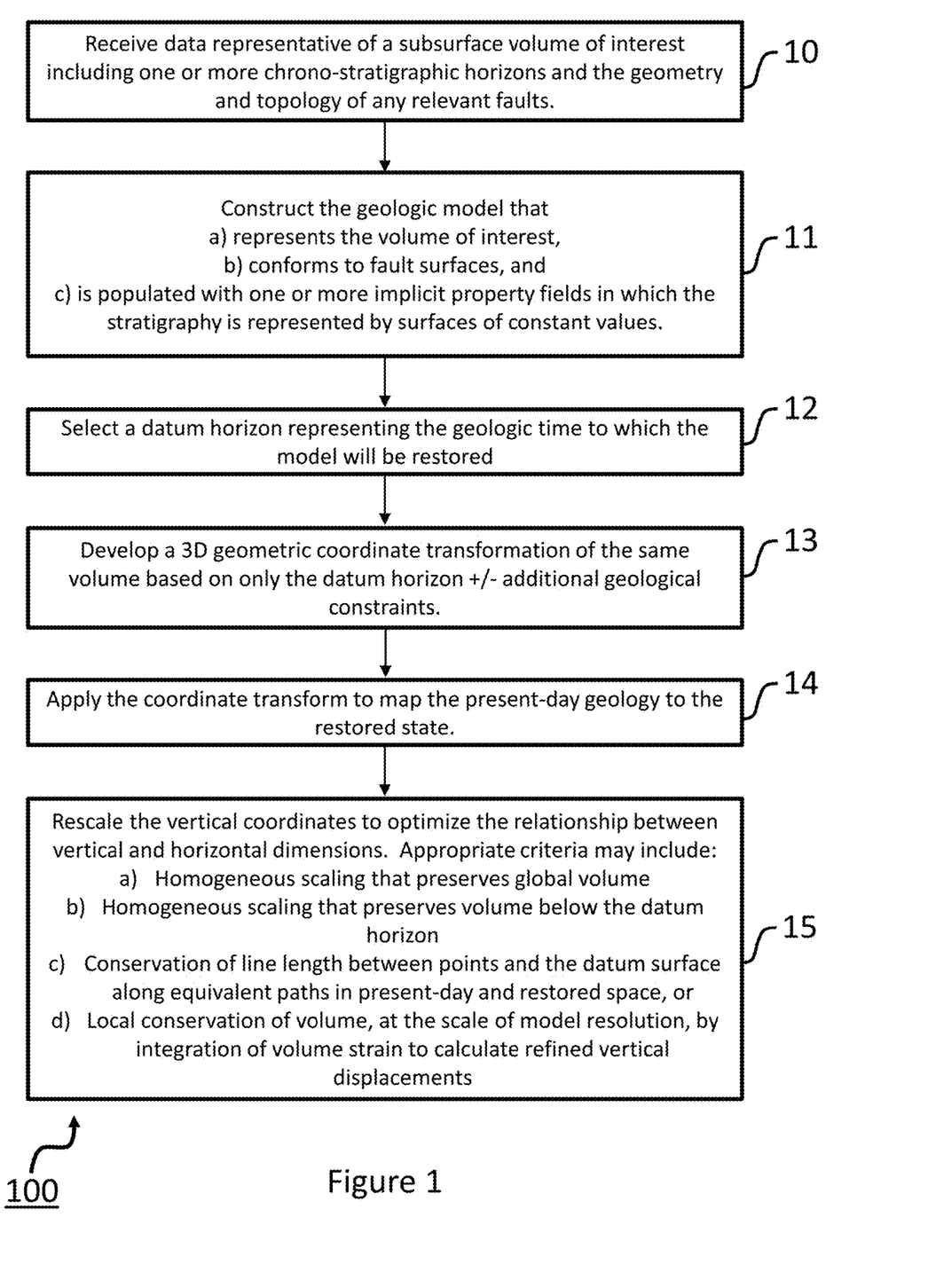
FIG. 1 illustrates a flowchart of a method of 3D restoration, in accordance with some embodiments.

An embodiment of the present invention is described in the workflow in FIG. 1. This embodiment performs 3D restoration using this new generation of Geological Knowledge-Oriented models.

Figure 2:
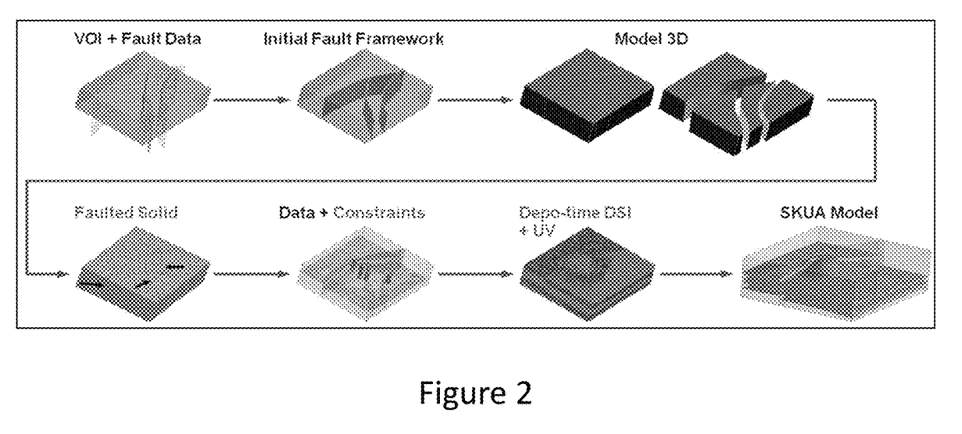
FIG. 2 illustrates an example workflow for construction of a geologic model.
Figure 3:
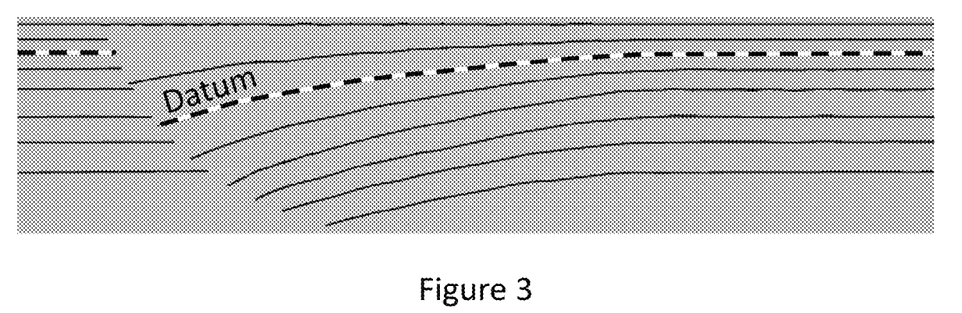
FIG. 3 illustrates selection of a datum horizon representing the geologic time to which the model will be restored.
Figure 4:
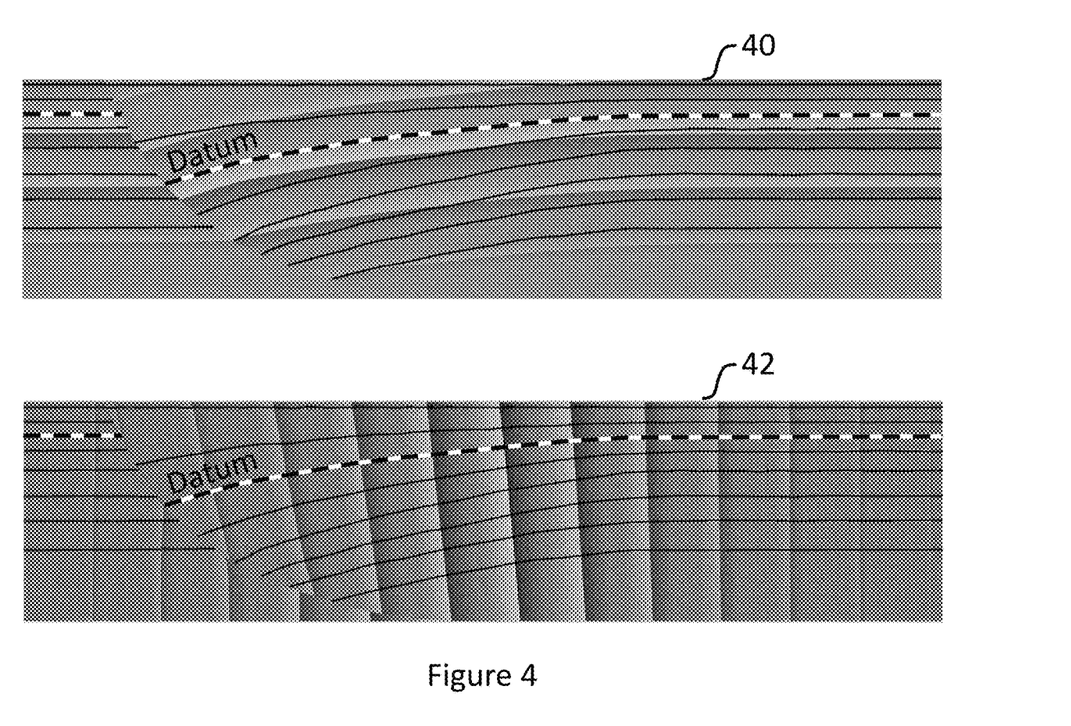
FIG. 4 illustrates the time & space coordinate transformation of the volume, based only on the datum horizon. Contours draped behind the stratigraphy show the vertical component (top) and horizontal component (bottom) for a 2-D cross-section through a 3-D model.

1. Receive data representative of a subsurface volume of interest including one or more chronohorizons and the geometry and topology of any relevant faults (10).
2. Develop a quantitative and robust structural model of the rock volume (11) for a given volume of interest (FIG. 2), using available software packages such as Paradigm's SKUA or Petrel's Volume Based Modeling, including
   a. the fault framework geometry,
   b. the fault topology, and
   c. one or more chronohorizons
3. Select a datum horizon (12), the deposition of which represents the geologic time to which the structural model should be restored (as seen in FIG. 3).
4. Use the Geological Knowledge-Oriented software (such as SKUA or Volume Based Modeling), to develop a 3D geometric (time and space) coordinate transformation (13) that will remap the defined volume of interest (FIG. 4) such that
   i. the datum horizon is represented by an isovalue surface of a paleo-vertical coordinate (i.e. the datum horizon maps to a horizontal plane in restored space)
   ii. the paleo-vertical coordinate is distributed throughout the subsurface volume of interest such that its gradient is approximately constant, and
   iii. optimization criteria, including at least minimization of 2D distortion within all isovalue surfaces of the paleo-vertical coordinate field within the volume of interest, are optimized between past and present states;

Furthermore, each of the three components of the restored coordinate system should be continuous throughout the volume of interest, except across faults, in present-day space. The transformation should minimize deviation from fault compliance in restored space.

Figure 5:
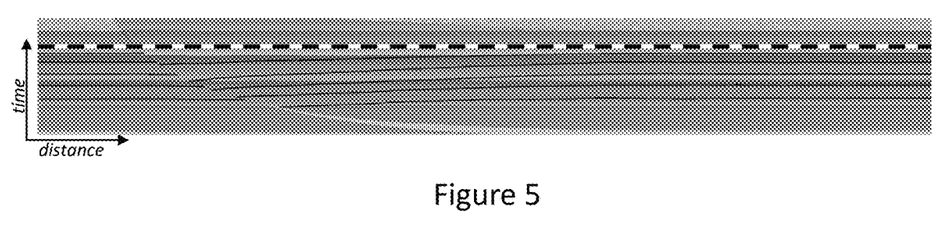
FIG. 5 illustrates the model after application of the transformation to the restored space. Note that the vertical axis is represented by non-dimensional units of time, which have no metric relation to depth.

5. Apply the corresponding 3D geometric coordinate mapping to geologic features (14) below the datum surface and, optionally, above the datum surface (FIG. 5). Additional spatially referenced geoscience data may be transformed in the same way. Applying the 3D geometric coordinate transformation may include disconnecting a tetrahedral mesh along fault nodes in order to represent field properties such as present-day coordinates in restored space.

Figure 6:
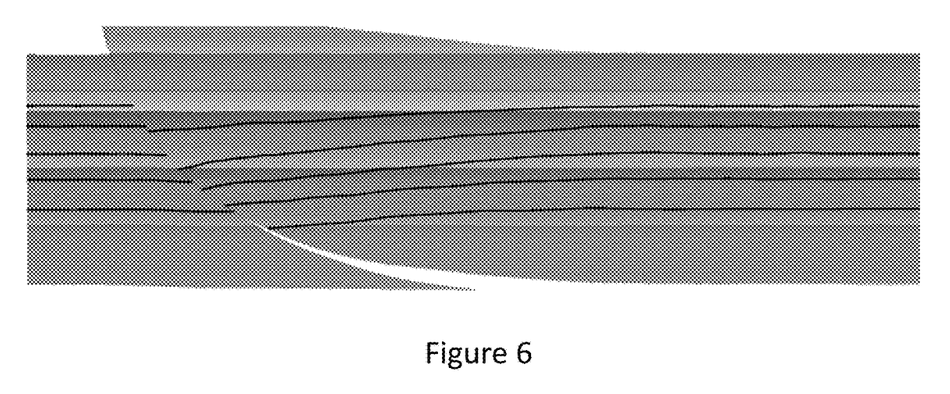
FIG. 6 illustrates the model after rescaling the vertical coordinates to optimize the relationship between vertical and horizontal dimensions.

6. Rescale the vertical axis (15) according to criteria that accurately relate vertical and horizontal dimensions (FIG. 6). In some cases, the rescaling may be included as part of the 3D geometric transformation rather than as a separate step. Criteria may include
   a. homogeneous scaling that preserves global volume,
   b. homogeneous scaling that preserves volume below the datum horizon,
   c. conservation of line length between points and the datum surface along equivalent paths in present-day and restored space, or
   d. local conservation of volume, at the scale of model resolution, by integration of volume strain to calculate refined vertical displacements.

Optionally, define a displacement vector field, which relates the present-day and restored positions in space. This vector field can be interpolated to increase resolution in time.

Optionally, additional constraints may be applied to the coordinate transformation. Such constraints might include
   i. Minimization of deviation between additional horizons, and isovalue surfaces of the paleo-vertical coordinate. Horizons may be pseudo-horizons, which are created by projection of the datum horizon, chronohorizons, or other stratigraphic surfaces.
   ii. Minimization of shear parallel to the isovalue surfaces of the paleo-vertical coordinate.

Optionally, the restored model may be decompacted to account for volume changes attributed to overburden load.

Optionally, if fault compliance is not adequately honored upon completion of the previous steps, recompute optimized horizontal coordinates using the method of step 4 (above), while preserving paleo-vertical coordinates calculated previously.

Optionally, sequential restorations can be developed using the same approach by
1. starting with the same original interpretation volume and
2. choosing an older datum horizon.

Optionally, interpolate displacement vectors between restored states of restoration steps to increase resolution in time.

Optionally, display model and/or geoscience data at each time step to animate structural evolution.

Optionally, transform geologic interpretation created in restored space to present-day space in order to update present-day geologic model.

The 3D transformation, as represented by the displacement vector field, may be used to transform geoscience data between any restored or present-day space, for purposes including, but not limited to, visualization and/or updating of the present-day geologic model.

FIG. 4 illustrates the coordinate transformation of the volume, based only on the datum horizon. Contours draped behind the stratigraphy show the vertical component (40) and horizontal component (42) for a 2-D cross-section through a 3-D model.

Figure 7:
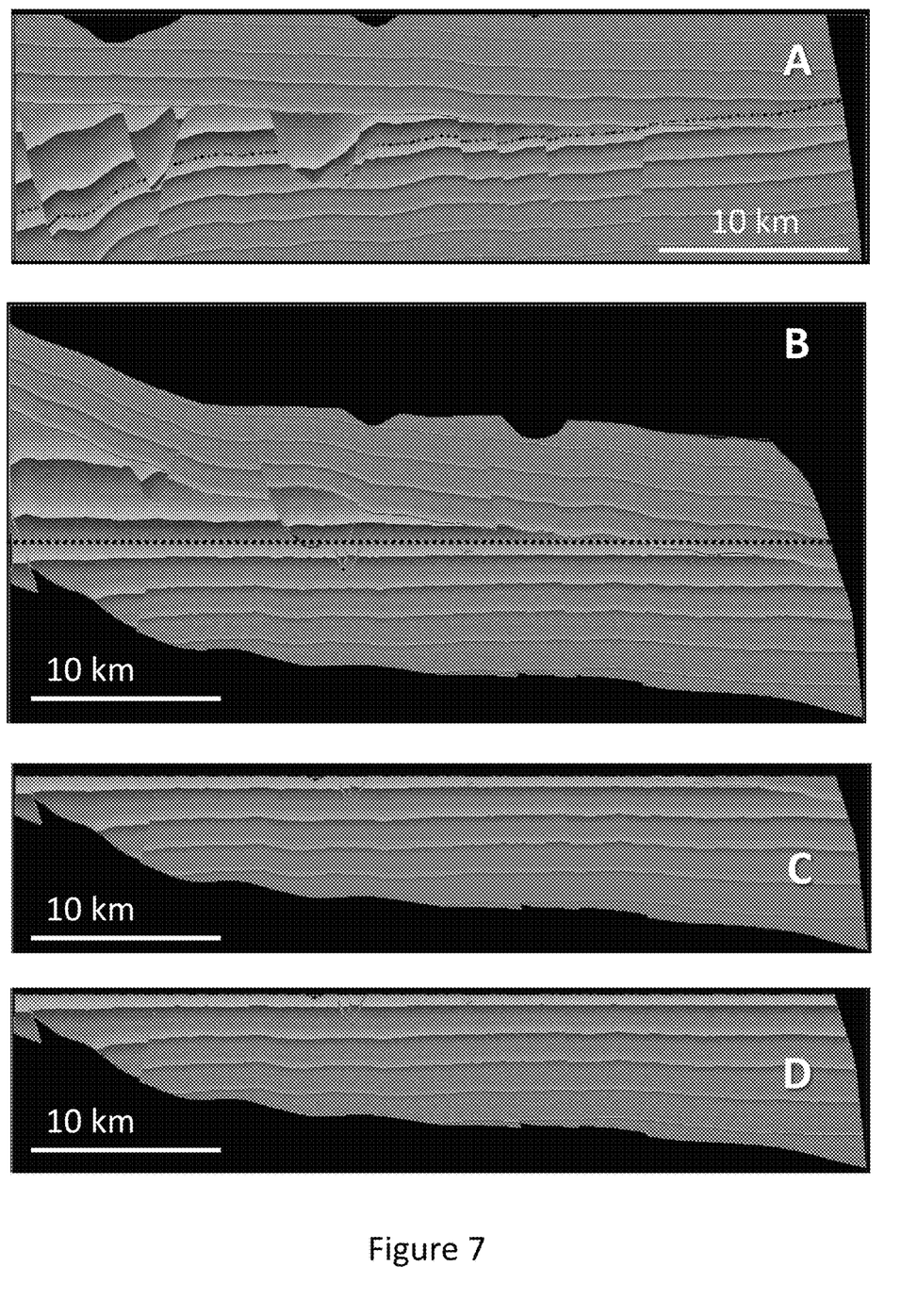
FIG. 7 is an example of an embodiment of a method for 3-D restoration.

An example application is shown in FIG. 7. FIG. 7 panel A is a section through the volume of interest colored by the interpolated geologic time value of the knowledge-based model. The restoration datum is shown as a dotted black line FIG. 7 panel B shows the full model restored to the time of deposition of the datum horizon. FIG. 7 panel C shows the same restoration as in 7 panel B, but with units younger than the datum surface removed. Note that because of erosion at the unconformity, younger units are nonetheless included in the section. FIG. 7 panel D corrects this inconsistency by filling in the eroded material as guided by the 3D parameterization of the lower sequence in the present-day state.

Once the geometric restoration is complete, the validity of the proposed interpretation can be evaluated using several criteria such as:

The relative position of geologic horizons in restored space, especially across faults The volume of over-lap &/or gaps between adjacent fault blocks.

The spatial distribution of the restoration strain field.

Figure 8:
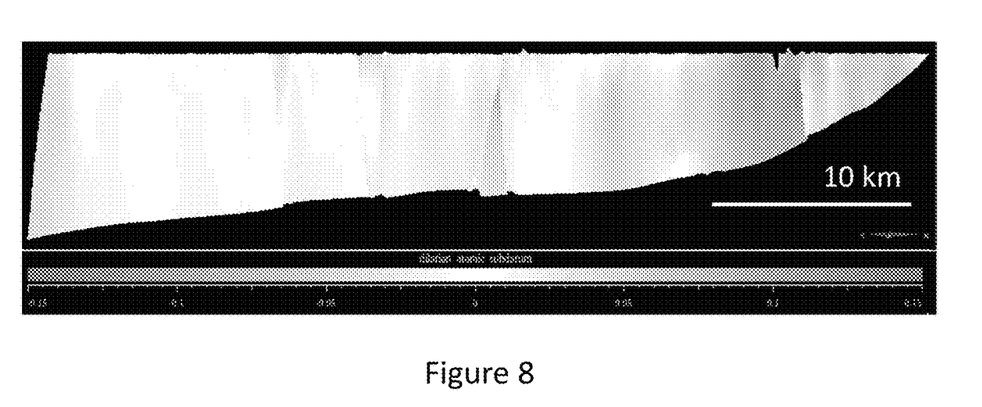
FIG. 8 illustrates the volumetric strain for the restored volume in FIG. 7.

The range of restoration dilation and shear strains (e.g. FIG. 8).

If the proposed interpretation is deemed sufficiently valid for further work, the restored geometry may be used as input data to form an initial state for high-fidelity, high-resolution basin modeling.

Early success of this workflow indicates that
   recent advances in knowledge-based earth models greatly facilitate 3D structural restoration,
   geometric constraints, such as minimal volume change and strain provide first order constraints on such restorations,
   use of 3D restoration for validation of structural interpretation and providing the starting point for forward physical modelling is now possible.

Figure 9:
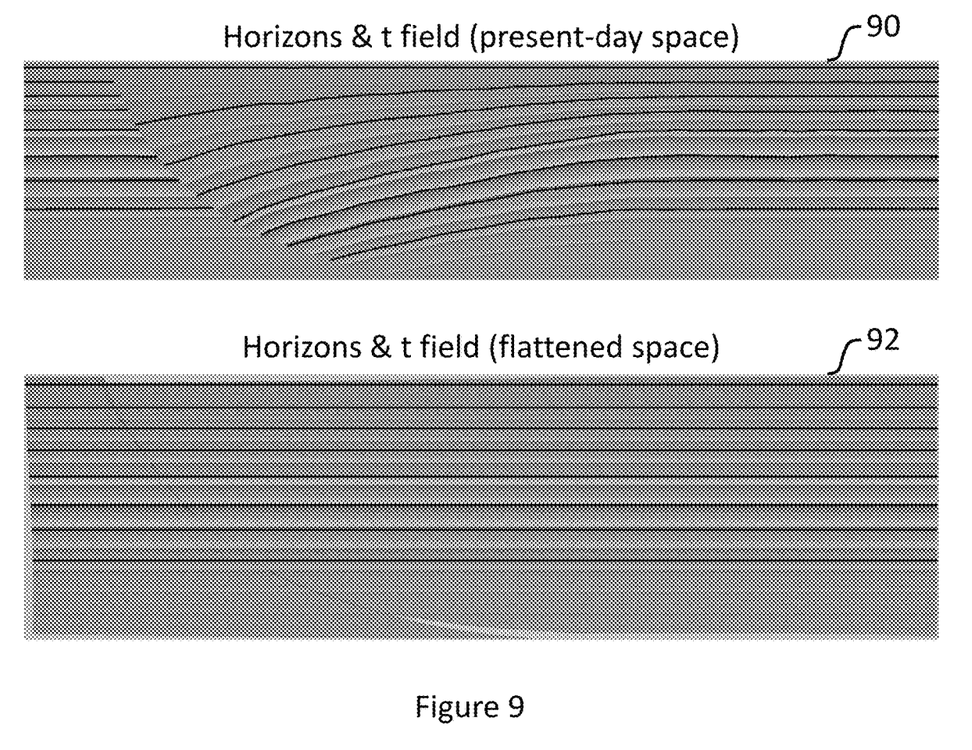
FIG. 9 illustrates conventional application of the time & space coordinate transform, in which all horizons are flattened and the vertical axis represents geologic time. The transformation does not preserve volume of rock and it does not represent geometry at any time in the past.

The workflow just described is distinct from the conventional functionality of Geological Knowledge Oriented modeling technology, in which the time and space coordinate transformation flattens every geological horizon (surface of constant geological age) in the model as shown in FIG. 9. In FIG. 9, the present-day geologic structure is shown in panel 90. In the transformed space as performed by the conventional modeling technology (panel 92), geologic time is represented by the vertical axis and paleogeographic coordinates by the horizontal axis. Such a transformation does not preserve layer thickness or volume, and does not provide a geologically plausible representation of subsurface geometry at any single time.

Figure 10:
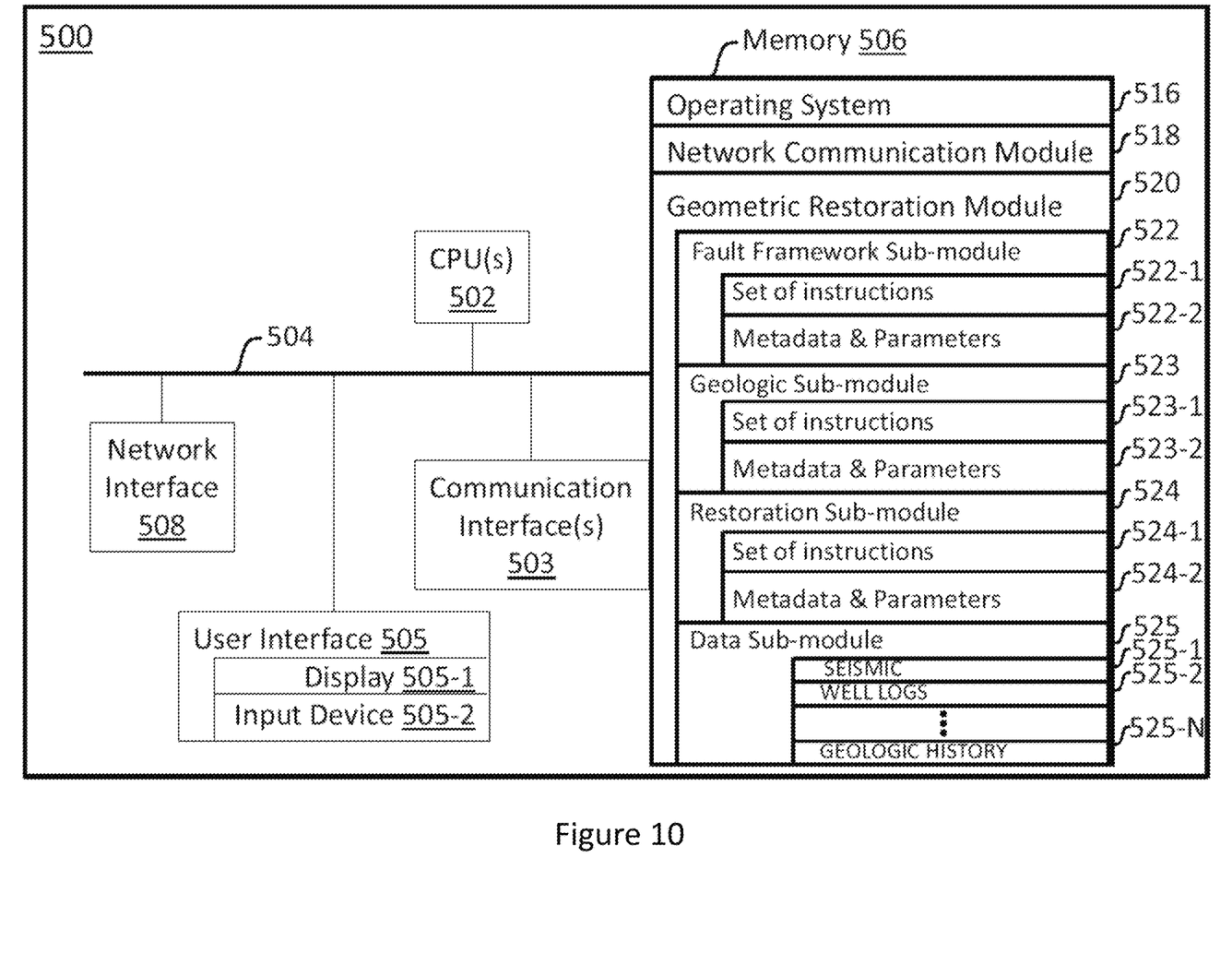
FIG. 10 is a block diagram illustrating a restoration system, in accordance with some embodiments.

FIG. 10 is a block diagram illustrating a subsurface restoration system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the subsurface restoration system 500 includes one or more processing units (CPUs) 502, one or more network interfaces 508 and/or other communications interfaces 503, memory 506, and one or more communication buses 504 for interconnecting these and various other components. The subsurface restoration system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store geoscience data.

In some embodiments, memory 506 or the non-transitory computer readable storage medium of memory 506 stores the following programs, modules and data structures, or a subset thereof including an operating system 516, a network communication module 518, and a geometric restoration module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the geometric restoration module 520 executes the operations of method 100. Geometric restoration module 520 may include data sub-module 525, which handles data including seismic data 525-1, well logs 525-2, and other data through geologic history 525-N. This data is supplied by data sub-module 525 to other sub-modules.

Fault framework sub-module 522 contains a set of instructions 522-1 and accepts metadata and parameters 522-2 that will enable it to execute operation 11 of method 100. The geologic sub-module 523 contains a set of instructions 523-1 and accepts metadata and parameters 532-2 that will enable it to contribute to operations 11 and 12 of method 100. The restoration sub-module 524 contains a set of instructions 524-1 and accepts metadata and parameters 524-2 that will enable it to execute at least operation 13 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the data or processed data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 10) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented geometric method of 3D structural restoration of a subsurface model, comprising:
   a. receiving, at a computer processor, data representative of a subsurface volume of interest including one or more chronohorizons and geometry and topology of any faults of relevance;
   b. developing, via the computer processor, a quantitative structural model of the subsurface volume of interest, including
      i. a fault framework geometry,
      ii. a fault framework topology, and
      iii. the one or more chronohorizons;
   c. selecting, via a human machine interface, a datum horizon, deposition of the datum horizon representing a geologic time to which the quantitative structural model should be restored;
   d. developing, via the computer processor, a 3D geometric coordinate transformation of the subsurface volume of interest such that
      i. the datum horizon is represented by an isovalue surface of a paleo-vertical coordinate,
      ii. the paleo-vertical coordinate is distributed throughout the subsurface volume of interest such that its gradient is approximately constant, and
      iii. optimization criteria, including at least minimization of 2D distortion within all isovalue surfaces of the paleo-vertical coordinate field within the subsurface volume of interest, are optimized between past and present states;
   e. applying, via the computer processor, the 3D geometric coordinate transformation to at least some geologic features in the quantitative structural model creating an alternate representation of the quantitative structural model; and
   f. rescaling, via the computer processor, the paleo-vertical coordinates of the alternate representation of the quantitative structural model according to criteria that accurately relate vertical and horizontal dimensions to generate a 3D restored model wherein the criteria used by the rescaling includes one or more of:
      i. homogeneous scaling that preserves global volume;
      ii. homogeneous scaling that preserves volume below the datum horizon;
      iii. conservation of line length between some or all points in the alternate representation of the quantitative structural model and the datum horizon along equivalent paths in present-day and restored space; and
      iv. local conservation of volume, at model resolution scale, by integration of volume strain to calculate refined vertical displacements.

2. The method of claim 1 wherein the rescaling is accomplished by the 3D geometric coordinate transformation which accurately relates vertical and horizontal dimensions.

3. The method of claim 1 wherein the optimization criteria further includes the minimization of shear strains parallel to the isovalue surfaces.

4. The method of claim 1 wherein the quantitative structural model is represented as structured or unstructured mesh or a meshless representation.

5. The method of claim 1 wherein the data further includes geoscience data and further comprises applying the 3D geometric coordinate transformation to any of the geoscience data to generate spatially transformed geoscience data.

6. The method of claim 1 further comprising decompacting the 3D restored model to account for volume changes attributed to overburden load.

7. The method of claim 1 wherein, if fault compliance is not adequately preserved, paleogeographic restoration coordinates of the 3D restored model are recomputed by developing a new 3D geometric coordinate transformation of the subsurface volume of interest while preserving previously calculated paleo-vertical coordinates.

8. The method of claim 1, whereby sequential restorations are developed by
   a. starting with the quantitative structural model and
   b. choosing a different datum horizon.

9. The method of claim 1 wherein time resolution is increased by interpolation of displacement vectors between restored and present states or wherein time resolution is increased by interpolation of displacement vectors between restoration states.

10. The method of claim 5 further comprising performing geologic interpretation on the 3D restored model or any of the spatially transformed geoscience data to create a restored geologic description.

11. The method of claim 10 wherein the restored geologic description is transformed to a present state using a reverse of the 3D geometric coordinate transformation.

12. The method of claim 1 wherein the developing a 3D geometric coordinate transformation is performed prior to the selecting the datum horizon.

13. A computer system, comprising:
   one or more processors;
   memory; and
   one or more programs, wherein the one or more programs are stored in the memory and configured to be executed by the one or more processors, the one or more programs including instructions that when executed by the one or more processors cause the device to execute a method comprising:
   a. receiving, at a computer processor, data representative of a subsurface volume of interest including one or more chronohorizons and geometry and topology of any faults of relevance;
   b. developing, via the computer processor, a quantitative structural model of the subsurface volume of interest, including
      i. a fault framework geometry,
      ii. a fault framework topology, and
      iii. the one or more chronohorizons;
   c. selecting, via a human machine interface, a datum horizon, deposition of the datum horizon representing a geologic time to which the quantitative structural model should be restored;
   d. developing, via the computer processor, a 3D geometric coordinate transformation of the subsurface volume of interest such that
      i. the datum horizon is represented by an isovalue surface of a paleo-vertical coordinate,
      ii. the paleo-vertical coordinate is distributed throughout the subsurface volume of interest such that its gradient is approximately constant, and
      iii. optimization criteria, including at least minimization of 2D distortion within all isovalue surfaces of the paleo-vertical coordinate field within the subsurface volume of interest, are optimized between past and present states;
   e. applying, via the computer processor, the 3D geometric coordinate transformation to at least some geologic features in the quantitative structural model creating an alternate representation of the quantitative structural model; and f. rescaling, via the computer processor, the paleo-vertical coordinates of the alternate representation of the quantitative structural model according to criteria that accurately relate vertical and horizontal dimensions to generate a 3D restored model wherein the criteria used by the rescaling
includes one or more of:
  i. homogeneous scaling that preserves global volume;
  ii. homogeneous scaling that preserves volume below the datum horizon;
  iii. conservation of line length between some or all points in the alternate representation of the quantitative structural model and the datum horizon along equivalent paths in present-day and restored space; and
  iv. local conservation of volume, at model resolution scale, by integration of volume strain to calculate refined vertical displacements.

14. A non-transitory computer readable storage medium storing one or more programs, the one or more programs comprising instructions, which when executed by an electronic device with one or more processors and memory, cause the device to execute a method comprising:
  a. receiving, at a computer processor, data representative of a subsurface volume of interest including one or more chronohorizons and geometry and topology of any faults of relevance;
  b. developing, via the computer processor, a quantitative structural model of the subsurface volume of interest, including
    i. a fault framework geometry,
    ii. a fault framework topology, and
    iii. the one or more chronohorizons;
  c. selecting, via a human machine interface, a datum horizon, deposition of the datum horizon representing a geologic time to which the quantitative structural model should be restored;
  d. developing, via the computer processor, a 3D geometric coordinate transformation of the subsurface volume of interest such that
    i. the datum horizon is represented by an isovalue surface of a paleo-vertical coordinate,
    ii. the paleo-vertical coordinate is distributed throughout the subsurface volume of interest such that its gradient is approximately constant, and
    iii. optimization criteria, including at least minimization of 2D distortion within all isovalue surfaces of the paleo-vertical coordinate field within the subsurface volume of interest, are optimized between past and present states;
  e. applying, via the computer processor, the 3D geometric coordinate transformation to at least some geologic features in the quantitative structural model creating an alternate representation of the quantitative structural model; and
  f. rescaling, via the computer processor, the paleo-vertical coordinates of the alternate representation of the quantitative structural model according to criteria that accurately relate vertical and horizontal dimensions to generate a 3D restored model wherein the criteria used by the rescaling includes one or more of:
    i. homogeneous scaling that preserves global volume;
    ii. homogeneous scaling that preserves volume below the datum horizon;
    iii. conservation of line length between some or all points in the alternate representation of the quantitative structural model and the datum horizon along equivalent paths in present-day and restored space; and
    iv. local conservation of volume, at model resolution scale, by integration of volume strain to calculate refined vertical displacements.

* * * * *